United States Patent
Engler et al.

(10) Patent No.: US 12,513,152 B2
(45) Date of Patent: Dec. 30, 2025

(54) FLEXIBLE MANAGEMENT OF RESOURCES FOR MULTIPLE USERS

(71) Applicant: EPLAN GMBH & CO. KG, Monheim am Rhein (DE)

(72) Inventors: Frank Engler, Cologne (DE); Phillip Falkenhagen, Mülheim an der Ruhr (DE)

(73) Assignee: EPLAN GMBH & CO. KG, Monheim am Rhein (DE)

( * ) Notice: Subject to any disclaimer, the term of this patent is extended or adjusted under 35 U.S.C. 154(b) by 92 days.

(21) Appl. No.: 18/701,680

(22) PCT Filed: Oct. 13, 2022

(86) PCT No.: PCT/DE2022/100758
§ 371 (c)(1),
(2) Date: Apr. 16, 2024

(87) PCT Pub. No.: WO2023/083405
PCT Pub. Date: May 19, 2023

(65) Prior Publication Data
US 2024/0422170 A1    Dec. 19, 2024

(30) Foreign Application Priority Data

Nov. 10, 2021   (DE) .................. 10 2021 129 282.4

(51) Int. Cl.
*H04L 9/40*   (2022.01)

(52) U.S. Cl.
CPC .......... *H04L 63/108* (2013.01); *H04L 63/104* (2013.01)

(58) Field of Classification Search
CPC ... H04L 63/108; H04L 63/104; H04L 63/102; G06F 17/30165; G06F 17/30203; G06F 17/30905; G06F 21/6218; G06Q 30/0645
See application file for complete search history.

(56) References Cited

U.S. PATENT DOCUMENTS

| | | | |
|---|---|---|---|
| 8,352,608 B1 | 1/2013 | Keagy et al. | |
| 10,152,265 B1 * | 12/2018 | Tomayko | ................ H04L 61/45 |
| 10,671,302 B1 * | 6/2020 | Aggarwal | ............... G06F 3/067 |

(Continued)

FOREIGN PATENT DOCUMENTS

| EP | 1262930 A2 | 12/2002 |
|---|---|---|
| TW | 201342869 A | 10/2013 |

OTHER PUBLICATIONS

N. Bleiel, "Collaborating in GitHub," 2016 IEEE International Professional Communication Conference (IPCC), Austin, TX, USA, 2016, pp. 1-3 (Year: 2016).*

(Continued)

*Primary Examiner* — Jung W Kim
*Assistant Examiner* — Sameera Wickramasuriya
(74) *Attorney, Agent, or Firm* — Harness, Dickey & Pierce, P.L.C.

(57) ABSTRACT

A method which performs, inter alia, the following: performing a login process at a web page for a first user, wherein the first user is assigned an identifier; performing a digital object generation process based on data entered by the first user at the web page, wherein the data includes an indication of an amount of a resource and a time period, and wherein the digital object includes the identifier and the indication of the amount of the resource and the time period.

10 Claims, 2 Drawing Sheets

(56) References Cited

U.S. PATENT DOCUMENTS

Figure 1A:
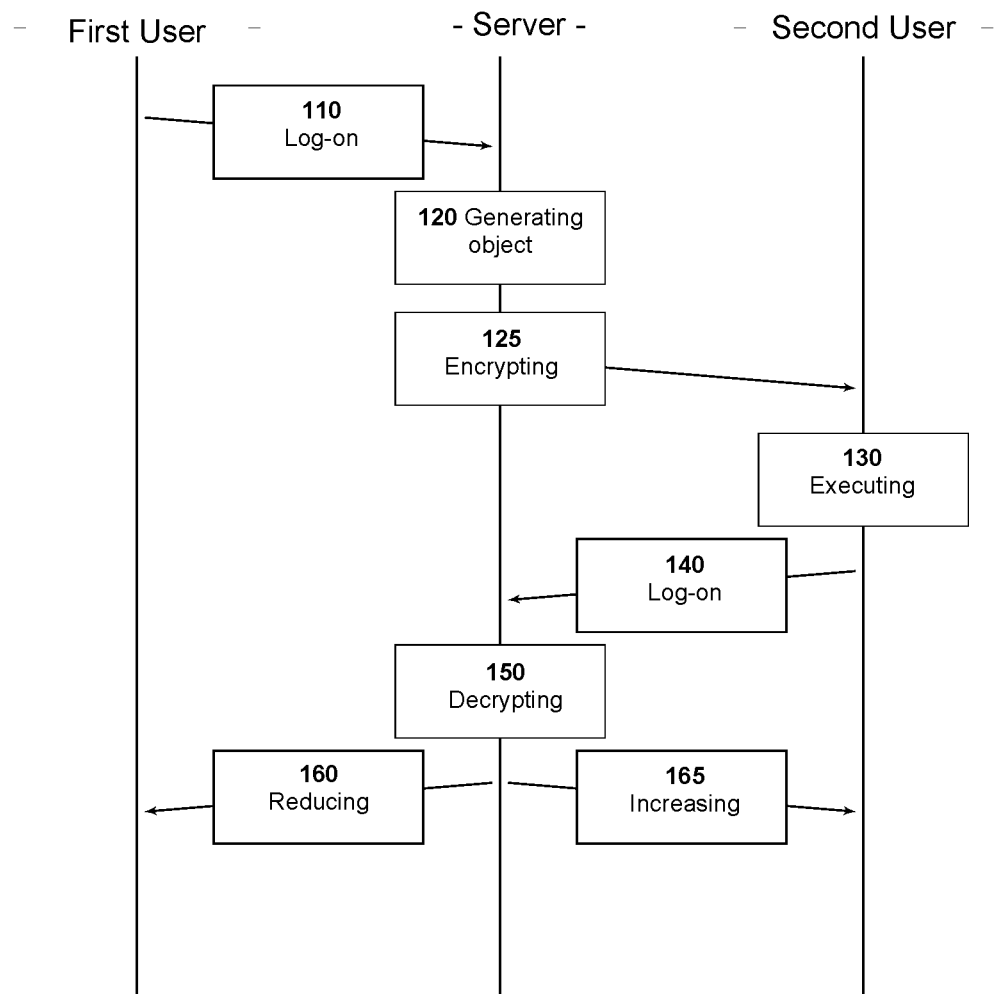

| | | | |
|---|---|---|---|
| 10,686,802 B1* | 6/2020 | Farhady Ghalaty | H04L 47/83 |
| 10,891,342 B2* | 1/2021 | Carter | H04L 67/52 |
| 11,632,360 B1* | 4/2023 | Tan | G06F 3/0622 |
| | | | 726/4 |
| 2003/0126394 A1* | 7/2003 | Fowler | G06F 3/0644 |
| | | | 711/170 |
| 2006/0174121 A1* | 8/2006 | Omae | H04W 12/069 |
| | | | 380/278 |
| 2007/0219911 A1 | 9/2007 | Abe | |
| 2008/0140672 A1* | 6/2008 | Tomida | G06F 16/119 |
| 2010/0030578 A1 | 2/2010 | Siddique et al. | |
| 2010/0332845 A1 | 12/2010 | Asaka | |
| 2011/0296029 A1 | 12/2011 | Jackson | |
| 2014/0074539 A1* | 3/2014 | Doering | H04L 63/10 |
| | | | 705/7.25 |
| 2014/0173753 A1* | 6/2014 | Sanso | H04L 63/104 |
| | | | 726/28 |
| 2014/0279893 A1* | 9/2014 | Branton | G06F 16/904 |
| | | | 707/634 |
| 2015/0163206 A1* | 6/2015 | McCarthy | G06F 21/6227 |
| | | | 726/4 |
| 2015/0186657 A1* | 7/2015 | Nakhjiri | H04L 9/0836 |
| | | | 713/193 |
| 2015/0188927 A1* | 7/2015 | Santhi | G06Q 10/0631 |
| | | | 726/4 |
| 2017/0289110 A1* | 10/2017 | Matsuo | G06F 3/1238 |
| 2019/0014120 A1* | 1/2019 | Drabant | H04L 63/104 |
| 2019/0243628 A1* | 8/2019 | Goldmann | G06F 16/188 |
| 2020/0019646 A1* | 1/2020 | Tadayon | H04L 63/20 |
| 2021/0124509 A1* | 4/2021 | Zeng | G06F 3/0673 |
| 2023/0123691 A1* | 4/2023 | Nunn | H04L 9/0819 |
| | | | 713/153 |

OTHER PUBLICATIONS

International Search Report (English and German) and Written Opinion of the ISA (German) issued in PCT/DE2022/100758, mailed Jan. 5, 2023; ISA/EP.

* cited by examiner

FLEXIBLE MANAGEMENT OF RESOURCES FOR MULTIPLE USERS

CROSS-REFERENCE TO RELATED APPLICATIONS

This application is a U.S. National Phase Application under 35 U.S.C. 371 of International Application No. PCT/DE2022/100758, filed on Oct. 13, 2022, which claims the benefit of German Patent Application No. 10 2021 129 282.4, filed on Nov. 10, 2021. The entire disclosures of the above applications are incorporated herein by reference.

BACKGROUND

This section provides background information related to the present disclosure which is not necessarily prior art.

TECHNICAL FIELD

The invention disclosed here is in the technical field of management of technical resources, for example allocation of storage space, for multiple users.

DISCUSSION

Resources for multiple users are usually managed by a central server, which the users can access from terminals. Such accesses are performed, for example, by a web browser or similar client-server software. Such a central management of data is referred to as a cloud. Accesses to such a server are usually subject to access restrictions and require authorization of the users.

TW 2013 42869 discloses the generation of authenticity certificates for data stored in a cloud. Authorizations for storage space are assigned on the basis of these authenticity certificates. In this case, attribute information is used, which is used to check whether a specific terminal is allowed to access the storage space.

EP 1262930 discloses the forwarding of an authorization to a mobile terminal, wherein this authorization enables the use of this mobile terminal to access a specific transaction system. The authorization comprises data defining a specific product or service.

SUMMARY

This section provides a general summary of the disclosure and is not a comprehensive disclosure of its full scope or all of its features.

It is one aspect of the invention to efficiently manage resources for multiple users.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1B:
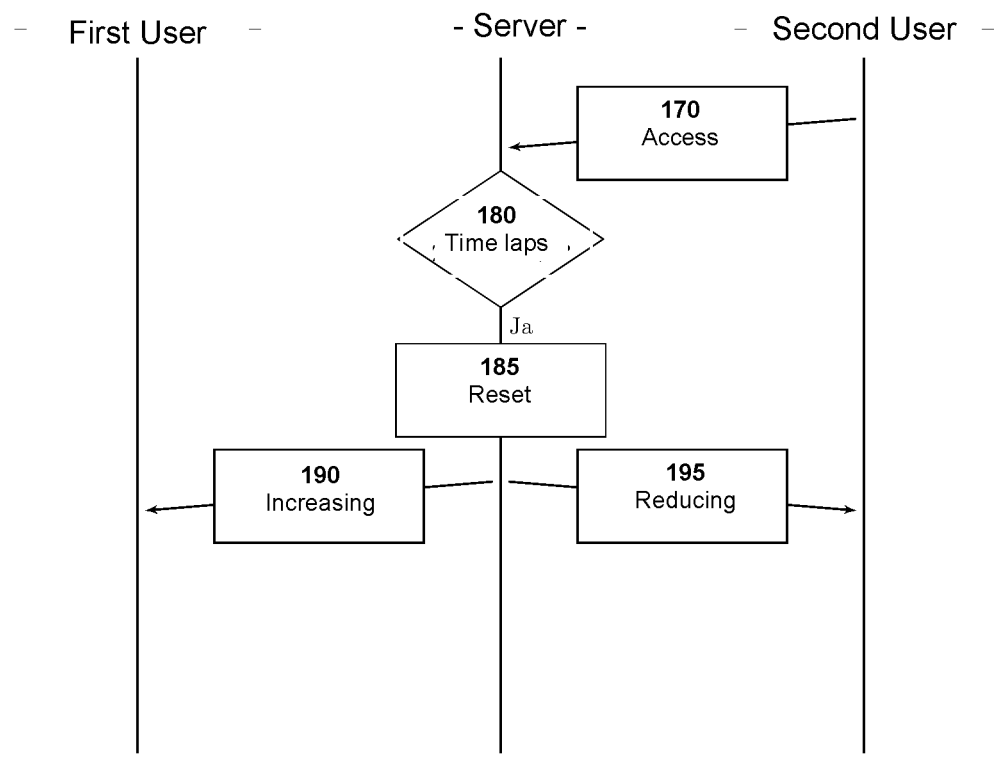

FIGS. 1A and 1B show examples of methods according to the invention.

DETAILED DESCRIPTION

Example embodiments will now be described more fully with reference to the accompanying drawings.

Embodiments of the invention disclosed here are used to manage technical resources for multiple users. The resources can comprise, for example, storage space on a server or accesses to specific data on a server. The server can be, for example, a cloud server or any web server that can be accessed via HTTP. In particular, the server can have a user database in which access data are stored, for example user names and passwords, possibly also unique identifiers for the users. These access data are indicated by users during their registration with the server and/or proposed by the server during the registration.

Users can log on to the server, and the server can enable the users to access specific resources. In the user database (or a separate database or other data structure) of the server, it can be indicated for individual users in which amount they are allowed to access specific resources (quota). This amount can be indicated, for example, in the form of a memory limit and optionally a currently used memory quantity. The server allows memory accesses of a user only if the data to be stored do not exceed a remaining total amount or remaining amount for the user.

In one embodiment, the invention relates to a method. The method begins with the log-on of a user to the server, for example by inputting user name and password into a web page of the server, which is displayed in a browser of the user. This log-on process can alternatively be performed by inputting other or additional data, for example by inputting a fingerprint scan, iris scan, or the like, and can also be performed automatically, for example by log-on data stored on the browser side, which are automatically transmitted by the browser when the web page is called up. Inputs of the user into a web page shown in the browser are performed by a terminal, for example a desktop computer or smartphone, or generally by a network-capable device.

The further steps of the method are used to define a resource by the user with the aim of enabling another user to access this resource. For this purpose, the user first inputs indications of the resource to be released: the user can fill in a mask on the web page, for example, which specifies the amount of the resource to be released, for example using the unit of measure of bytes. In order to support the user in this case, the web page can provide a controller in the mask, which makes it possible to select a specific quantity of bytes. Preferably, the maximum selectable quantity corresponds to the quota assigned to the current user, and the minimum selectable quantity corresponds to zero. Alternatively, this range can lie between the memory quantity occupied by the current user and the remaining memory quantity for this user. As a further alternative, the user can input a free amount of bytes without such a controller, for example into a corresponding text field, or can select a range from a graphical representation of his resources, for example by selecting a circle sector from a circle which symbolizes the resources of the user.

Furthermore, the user also indicates the user for whom the resource is to be released in the specified amount, and a time period within which the other user is allowed to access the resource. The indication of the user can comprise his email address or his user name stored on the server. The time period can be indicated as a one-dimensional value (examples: 24 hours; five weeks; three months, etc.) or as an absolute start and end time (example: 26.10.2021, 16:35 hours, until 26.10.2022, 16:35 hours). Alternatively, a combination can also be defined, for example five weeks from 26.10.2021, 16:35 hours. These values can be defined freely in a text field or else by one or more controllers (first controller for start time, second controller for end time), or also using a graphical day/week/month and/or year overview. If the current user is in turn subject to a time restriction, these elements can restrict the selection of the time period to the time period applicable to the current user or his resources and only allow this value as the maximum selectable end time. The current time is considered to be the minimum start time.

The server generates a digital object from these data. This object can be a file, an entry in a database, a data structure stored only in a working memory, a BLOB (Binary Large Object) or the like. In one embodiment, the object is or includes a URI (Unified Resource Identifier). This object includes the aforementioned indications relating to the amount of the resource to be released and the time period, optionally also an indication of the user to whom the resource is to be transferred. In addition, the object includes an indication of the current user, for example his user name or identifier. This can be used on the server side as an identifier of the user; alternatively, in addition to the user name, a unique identifier can be used, which is associated with the user name for example in the database. The generation of the digital object can comprise a check as to whether the amount of the resource to be released lies within the amount of the resource assigned to the current user or assigned to this user as a not yet used resource (free storage space); if this condition is not met, the process can be aborted or the amount can be reduced to the (remaining free or total) amount of the resource of the current user. However, this check is optional, and in particular not necessary, if a restriction to the amount of the resource of the current user has already been enforced during the input of the amount of the resource to be released, for example by the above-explained maximum values.

In addition or alternatively to the aforementioned check, it can be determined whether the amount of the resource to be released exceeds the amount of the resource assigned to a group of users. In this embodiment, the invention distinguishes between identifiers or user names of individual users and identifiers for groups of users. A group identifier can designate, for example, employees of a company. User identifiers and group identifiers can be stored in the same database (user database), wherein a user identifier is associated with one or more group identifiers (stored together), and wherein a group identifier is associated with one or more user identifiers. In this way, it can be determined for a user identifier which groups belong to it, and it can be determined for a group identifier which users belong to it. Groups can be associated with an amount of a resource, analogously to users. Two alternatives are possible for checking whether an amount of a resource to be released by a user does not exceed the amount of a group. Firstly, a comparison of the amount of the resource to be released with the sum of the amount of the resource of the user and the amount of its groups can be made. Secondly, a comparison of the amount of the resource to be released with the sum of the resources of all users of the group(s) of the current user can be made. In this second example, it is sufficient if group identifiers in the database are associated only with users, but not with an amount of a resource for the entire group; this can be determined on the basis of the individual user identifiers. If the amount of the resource of the group exceeds the amount of the resource to be released, this can either be automatically adapted or the process can be aborted.

The digital object is preferably encrypted, for example with a public key of the other user or the target group, or with a public key of the server or a symmetric key of a key pair that is known only to the server, and is transmitted to the other user or the users of the group, for example by sending an email or an instant message. Alternatively, the key or the key pair can be generated separately and is stored in the database/data structure with the relevant user(s) and/or the group. The sending medium (email or message) can include, in addition to the encrypted object, indications of its use, for example the address of the server and information on the content and/or instructions for applying the object. In the following, the second user who receives the object will always alternatively also be understood to mean one or more groups of users, without this being explicitly mentioned. In principle, a user (second user) who releases a resource can indicate one or more users and/or groups, and all addressees, that is to say users and/or groups and their users, can carry out the steps described here for accessing the resource. However, the released resource as a whole can be used only once, as is illustrated below.

The second user can log on to the server after receiving the digital object, possibly after passing through a first registration process, and transmits the digital object back to the server. This transmission can be performed in the form of an upload of the object. Alternatively, the second user can activate a link transmitted in the email or message, which loads the web page of the server in a browser of the user and at the same time transmits the digital object to the server. As a further alternative, the second user can execute the digital object directly in the email or message and thereby trigger the loading of the web page and transmission of the digital object. If the digital object includes a URI, the execution of the object comprises calling up this URI in a browser.

The server decrypts the digital object by using a private key of the server. Alternatively, the digital object can already be decrypted on the part of the second user by using a private key of the second user. As a further alternative, the server can decrypt the digital object by using the already mentioned symmetric key of the server. If the key is assigned to specific users, the server can take the key from the entry of the relevant user in the database or data structure, and the process can be aborted if no key is present. In one embodiment, the key can be deleted after decrypting.

As a result, the server adapts indications of resources of the first and the second user to the indications from the digital object. In one embodiment, this is performed immediately after decrypting the digital object; this is particularly true for embodiments in which the time period was indicated as a one-dimensional value. If, however, the time period comprises a time start point in the future, the adaptation is performed only when this time point is reached.

If a plurality of addressees, that is to say a plurality of users and/or groups, were indicated by the first user, the server repeats the aforementioned steps each time one of the addressees executes the object. The adaptation of indications of respectively assigned resources is carried out analogously for each executing user, wherein the specific resource to be released is entered multiple times, namely for each of these addressees. For this purpose, the method can internally note precise indications of the resource, for example memory addresses, for the users involved.

The adaptation of the indications by the server comprises reducing the amount of resource available to the first user by the resource indication in the digital object. In parallel, the amount of resource of the second user is increased by this indication, if appropriate (embodiment with a plurality of addressees) in addition to indications of specific addresses of the resource. In addition, the time sequence of this reduction or increase is stored on both sides (first and second user), for example by storing a current timestamp and the time period, or by storing the start and end time. The server can additionally define an instruction which is executed when the time period expires and reverses the reduction and increase. Such an instruction can be implemented on Unix systems, for example by Cron or systemd. Alternatively, the server can implement a handler and execute this at the expiration date. As a further alternative, the server can check only during a specific access of a user to the server whether one or more time periods have expired in the meantime, and perform reductions/increases even before this access.

The reduction and increase of values can be performed directly on the user database already explained. Alternatively, a separate database can be provided, which is used only to track resource allocations. As a further alternative, any data structure, for example a table, can be used.

During each access of one of the users to the resources respectively assigned to them, for example accesses by uploading data to the server, the server checks whether the specific access to the resources lies within the amount stored for the respective user. The access is denied if the amount is exceeded.

After expiration of the time period, as already explained, the reduction and increase of the amount of the resource in both users is reversed again, and the corresponding indications in the user database or other data structure are adapted accordingly. Subsequent accesses of the users to their resources are now checked with regard to the new indications and possibly denied. The expiration of a time period can, as described, always be checked when a user accesses his resources. In addition, this can already be checked before the first reduction or increase; in this case, the increase/reduction is aborted if the time period has already expired. The checking of the time period comprises comparing the current time with the time indications in the database/data structure, for example by adding a timestamp and a time period in the database/data structure and comparing the result with the current time. In one embodiment, keys that were necessary for decrypting the digital object can be deleted after expiration of the time period.

The method can request the users involved and in particular the users of possibly involved groups to agree to specific steps of the method, and can abort if an agreement is denied. This request can be made, for example, before a change of resource indications (reduction/increase) is performed. In particular, the second user can be requested accordingly. Such a request can also already be made when creating the digital object, for example when the first user is assigned to one or more groups and the resource to be released exceeds his own resources (without the group resources).

The method described above can be carried out by any user known to the server. Each user can release resources to one or more users, also groups, within the scope of the amount of resources assigned to him. This scope can, as described, be reset to an original scope after expiration of a time period. For an individual user, a plurality of increases/reductions can be made, which go back to different users. Thus, the available amount of resources for a user can change again and again. Chains of user relationships can also arise, in which each user of a chain releases resources for further users and receives these resources in each case after expiration of a time period. The invention ensures that users can always only access the currently assigned amount of resources, and ensures that resources can only be passed on/released in the available amount.

In one embodiment, in addition to reducing/increasing the amount of resources of respective users, the invention also comprises the indication of specific resources which are passed on. For example, the first user can already indicate specific features of the resource, for example specific directories, when inputting details about the resource to be passed on. For the duration of the transmission of the resource to another user, the first user cannot then access the specific resource (directories). After returning the resource (time lapse), the access is again possible for the first user. In this way, the first user can enable the second user to process data which are already part of this resource, and can continue to process the data later. Furthermore, in this embodiment it can be noted, for example in the database/data structure, to which users or groups a specific resource has currently been passed on, and how much time remains until the resource is returned. The first user can view these data, for example via the already explained web page of the server.

Further embodiments comprise computer-readable media having instructions stored thereon that, when executed by a processor, perform the steps of the above method. Furthermore, embodiments of the invention also comprise a server which is configured to perform the above method. The server is connected to terminals via a network and communicates with one or more users who operate these devices. The server is, for example, an HTTP server and can be a software-based server and/or an independent network-capable device. Embodiments of the invention further comprise a system which comprises the mentioned server and one or more terminals which are all connected to one another via network connections.

The invention thus enables efficient management, allocation and passing on of resources between users.

FIG. 1A shows a method 100 A according to the invention for passing on usage rights to a resource. In the following, the essential steps of the method are reproduced. However, the different embodiments described above can readily be combined with the steps reproduced here. Conversely, details which are described with reference to FIG. 1A can be combined with the above-mentioned embodiments. Thus, FIG. 1A shows, for example, a "second user"; however, the steps relevant to this user can also be performed successively or simultaneously for a plurality of second users, in particular for a plurality of users belonging to one or more groups.

The method 100 A is substantially carried out on a server and comprises the participation of a first user and a second user who access the server via respective network-capable devices, for example. The method 100 A begins with a log-on 110 of the first user to the server. As already described, this can be performed by inputting user name and password, either automatically via cookies and browser functionality or manually by the user himself. The user thereby reaches a web page of the server, which is displayed on the device of the user and can be used to access resources of the user. In addition, the web page offers functionality for specifying a resource which the server manages and which the user has and which he would like to pass on—completely or partially—to one or more users or also a group of users. This functionality can be called up, for example, by operating a link on the web page. Subsequently, the user defines the amount of the resource to be passed on and the target user or users and/or groups and a time restriction, for example a time period within which the resource can be used by the other user, and after the expiration of which the resource falls back to the first user. In step 120, the server generates a digital object that includes the indications of the first user. The object is encrypted, step 125, and transmitted to the second user or users. The key used for the encryption can, as already described, be a public key of the server, a public key of the second user (or of a group to which this user belongs), a symmetric key of the server, or the like. In one embodiment, a key or a key pair can be generated separately in the course of each such encryption. The key pair can be stored in the database in association with the target users and/or groups. In one embodiment, only the private key of an asymmetric key pair is stored in this way, and the public key is deleted again directly after the encryption.

The second user or users or the members of a group named in the object receive the object from the server. In order to be able to access the resource defined in the object, the users must be registered and logged in at the server. This registration and/or log-on can be simplified by executing the object by the receiver or receivers, for example by operating a URI that was transmitted with the object or that is called up by executing the object, steps 130 and 140. The object can be transmitted back to the server after the log-on has been performed. In one embodiment, both the transmission to the users and the transmission back to the server can be omitted, and the server instead identifies the object on the basis of the names or identifiers of the now logged-on users. In such an embodiment, the object can be associated with the relevant users after its creation, for example in a database that also holds further indications of the users.

The server decrypts the object in step 150, for example using keys that are associated with the second user and are stored in the database. If appropriate, it is already checked at this time whether a time period defined in the object has already expired. The server reads the indications relating to the resource to be released from the object and adapts the resource rights of the first and the second user in the database by reducing the amount of the resource of the first user by the amount of the resource of the object, and by increasing the amount of the resource of the second user by the amount of the resource of the object, steps 160 and 165. The passing on of the rights to the resource is thus concluded.

FIG. 1B shows a further method 100 B that reproduces the access of a user to his resources.

In step 170, the second user or users access resources that the server manages. The user must already be logged in at the server at this time. The server first checks whether the access exceeds the amount of the stored amount of the resource of the second user. In addition, it can be checked in this case whether the amount of resources of this user is subject to a time lapse completely or partially. If the latter condition is met, the amount of the resource is reduced by an amount indicated in the database (stored after the decryption of the object performed in the method 100 A) and the amount of the resource of the first user (also stored after the decryption of the object in connection with the amount of the resource of the second user) is increased accordingly, steps 185, 190 and 195. Only if the remaining amount of the resource of the second user still allows the access after this measure is this further processed; otherwise, the access is denied.

If multiple second users access a resource independently of one another, which was assigned to them collectively and the time period of which had expired, the resource is already transmitted back—as described—during the first of these accesses. In one embodiment, the retransmission (reduction and increase) can additionally be performed a retransmission of all original addressees of the digital object, wherein the increase on the part of the first user and the reductions of all other users of the resource are each performed once. In this embodiment, it can already be determined after the first of the accesses (and the determined expiration of the time period) which other users use this resource. For this purpose, it can already be noted in the course of steps 150, 160 and 165 (decryption, reduction, increase) of the method 100 A in the data structure in an entry of the first user for which users the resource was released.

One advantage of the invention is that users can independently pass on rights to their resources to other users without a switching center being required for this. This is substantially more efficient than conventional measures for transmitting rights, and also more secure due to the reduced number of transactions. The invention enables the passing on of rights even if the target user is not yet known at all to the server; for this purpose, a registration en passant is provided.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method comprising:
performing a login process at a server for a first user, wherein the first user is assigned an identifier;
performing a digital object generation process based on data entered by the first user at the server, wherein the data includes an indication of an amount of a resource, and wherein the digital object includes the identifier and the indication of the amount of the resource and a time period;
encrypting the digital object and transmitting the digital object to a second user, wherein a destination address of the second user is indicated by the first user of the server;
performing a registration or login process via the server for the second user in response to execution of the digital object by the second user;
decrypting the digital object and reading the identifier of the first user and the indication of the amount of the resource and the time period;
reducing an indication of an amount of the resource for the first user in a data structure by the indicated amount of the resource, and increasing an indication of an amount of the resource for the second user in the data structure by the indicated amount of the resource;
storing the time period for the first user and the amount of the resource in the data structure, and storing the time period for the second user and the amount of the resource in the data structure;
increasing the indication of the amount of the resource for the first user in the data structure after expiration of the time period for the first user, and reducing the indication of the amount of the resource for the second user in the data structure after expiration of the time period for the second user.

2. The method of claim 1, wherein performing the digital object generation process comprises checking whether the amount of the resource exceeds the amount of the resource assigned to the first user; or wherein the first user belongs to a group of users determined based on the identifier of the first user and an identifier of the group, and wherein performing the digital object generation process comprises checking whether the amount of the resource exceeds a sum of amounts of the resource of all users assigned to the group.

3. The method of claim 1, wherein the digital object includes a URI, and wherein executing the digital object comprises operating the URI in a browser.

4. The method of claim 1, wherein storing the time period additionally comprises storing a current timestamp in the data structure.

5. The method of claim 4, further comprising checking whether the time period has expired before increasing the indication of the amount of the resource for the first user and reducing the indication of the amount of the resource for the second user is performed, wherein the checking is performed based on a current timestamp and the time period stored in the data structure and an associated timestamp.

6. The method of claim 1, wherein transmitting the digital object is performed by email or by a messaging system.

7. The method of claim 1, wherein encrypting the digital object is performed by a key that is automatically generated for the first user and stored in the data structure, and wherein decrypting the digital object comprises using the key.

8. The method of claim 7, wherein the key is deleted after decrypting or after the time period has expired, and wherein the method is aborted if the key is not present before decrypting the digital object.

9. The method of claim 1, wherein the method requests the second user to agree to an adjustment of his rights to the resource before or after decrypting the digital object, and wherein the method aborts if the second user does not agree.

10. A non-transitory computer-readable medium having instructions stored thereon that, when executed by a processor, a method comprising:

performing a login process at a server for a first user, wherein the first user is assigned an identifier:

performing a digital object generation process based on data entered by the first user at the server, wherein the data includes an indication of an amount of a resource, and wherein the digital object includes the identifier and the indication of the amount of the resource and a time period;

encrypting the digital object and transmitting the digital object to a second user, wherein a destination address of the second user is indicated by the first user of the server;

performing a registration or login process via the server for the second user in response to execution of the digital object by the second user;

decrypting the digital object and reading the identifier of the first user and the indication of the amount of the resource and the time period;

reducing an indication of an amount of the resource for the first user in a data structure by the indicated amount of the resource, and increasing an indication of an amount of the resource for the second user in the data structure by the indicated amount of the resource;

storing the time period for the first user and the amount of the resource in the data structure, and storing the time period for the second user and the amount of the resource in the data structure;

increasing the indication of the amount of the resource for the first user in the data structure after expiration of the time period for the first user, and reducing the indication of the amount of the resource for the second user in the data structure after expiration of the time period for the second user.

* * * * *